(12) United States Patent
Liu

(10) Patent No.: US 7,785,723 B2
(45) Date of Patent: Aug. 31, 2010

(54) BATTERY DEVICE WITH PLURAL JOINED-TOGETHER BATTERIES

(76) Inventor: Yun-Zhao Liu, No. 3, 2nd St., Hsinfeng Rd., Huangpu Township, Zhongshan City, Guangdong Province (CN)

( * ) Notice: Subject to any disclaimer, the term of this patent is extended or adjusted under 35 U.S.C. 154(b) by 248 days.

(21) Appl. No.: 11/822,313

(22) Filed: Jul. 5, 2007

(65) Prior Publication Data

US 2009/0011286 A1 Jan. 8, 2009

(51) Int. Cl.
*H01M 14/00* (2006.01)
*H01M 6/42* (2006.01)

(52) U.S. Cl. .......................................... 429/7; 429/151
(58) Field of Classification Search ..................... 429/7, 429/151, 156, 157
See application file for complete search history.

(56) References Cited

U.S. PATENT DOCUMENTS 4,265,984 A * 5/1981 Kaye ........................... 429/178
6,224,997 B1 * 5/2001 Papadopoulos ............... 429/99
2005/0135091 A1 * 6/2005 Sharrah et al. ............. 362/183
2006/0099498 A1 * 5/2006 Chang ......................... 429/149

* cited by examiner

*Primary Examiner*—Dah-Wei D Yuan
*Assistant Examiner*—Stephan Essex
(74) *Attorney, Agent, or Firm*—Rosenberg, Klein & Lee

(57) ABSTRACT

A battery device includes a battery set, and a casing; the casing includes a right covering part and a left covering part, which are joined together to provide a holding room for the battery set; the battery set include at least two batteries, and are held in the casing with positive and negative poles thereof being exposed through front and tail ends of the casing respectively; a socket is held in the casing, and electrically connected with the positive and the negative poles of the battery set; thus, after a plug of a charger is inserted in the socket, the single-part batteries together will be charged through the charger without the battery device being located on the charger.

7 Claims, 3 Drawing Sheets

BATTERY DEVICE WITH PLURAL JOINED-TOGETHER BATTERIES

BACKGROUND OF THE INVENTION

1. Field of the Invention

The present invention relates to a battery device with plural joined-together batteries, more particularly one, which includes at least two single-part batteries joined together to be convenient to use.

2. Brief Description of the Prior Art

Currently, several common chargeable single-part batteries can be directly put in an electric appliance to supply power; to charge such chargeable single-part batteries, first the batteries are taken out of the electric appliance, and positioned on a charger one by one.

Or alternatively, several common chargeable single-part batteries can be held and fixed in a plastic box to comprise a battery set; to charge such a battery set, first the plastic box with the batteries is taken out of the electric appliance, and located on a charger. Therefore, the above conventional chargeable batteries are inconvenient to use. Furthermore, chargers for the conventional chargeable batteries have relatively large dimensions because they have a hollow holding portion to contain the batteries. Consequently, it takes relatively much cost to manufacture the chargers.

SUMMARY OF THE INVENTION

It is a main object of the present invention to provide an improvement on a battery device to overcome the above problems.

A battery device according to an embodiment of the present invention includes a battery set, and a casing. The casing includes right and left covering parts joined together to provide a holding room. The battery set include a first single-part battery, and a second single-part battery, which are connected in series. The battery set are held in the casing with positive and negative poles being exposed through front and tail ends of the casing respectively.

The left and the right covering parts of the casing can be glued together or welded together by means of ultrasonic welding; the left and right covering parts have rib portions on two sides of openings thereof to be welded/glued together.

The battery device further has a protective circuit board in the casing for making charging/discharging safe.

Each of the left and the right covering parts has a separating rib portion in an internal space thereof, and the separating rib portions divide the casing into a first holding portion to contain the batteries, and a second holding portion, in which a socket is secured; one of the left and the right covering part having a lateral hole thereon, and an opening of the socket faces the lateral hole.

The socket is electrically connected with the positive and the negative poles of the battery set.

The battery device further comprises positive and negative electrodes, which are arranged on one of front and tail ends of the casing.

The positive electrode is disk-shaped, and the negative electrode is ring-shaped. The positive and the negative electrodes are coaxial with the battery set.

The positive electrode is installed in an electrode holder, and the negative electrode in a negative electrode holder. The negative electrode holder has a middle hole, and is superimposed on the electrode holder. The positive electrode is exposed through the middle hole of the negative electrode holder Therefore, after a plug of a charger is inserted in the socket, the single-part batteries together will be charged through the charger without the battery device being located on the charger.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
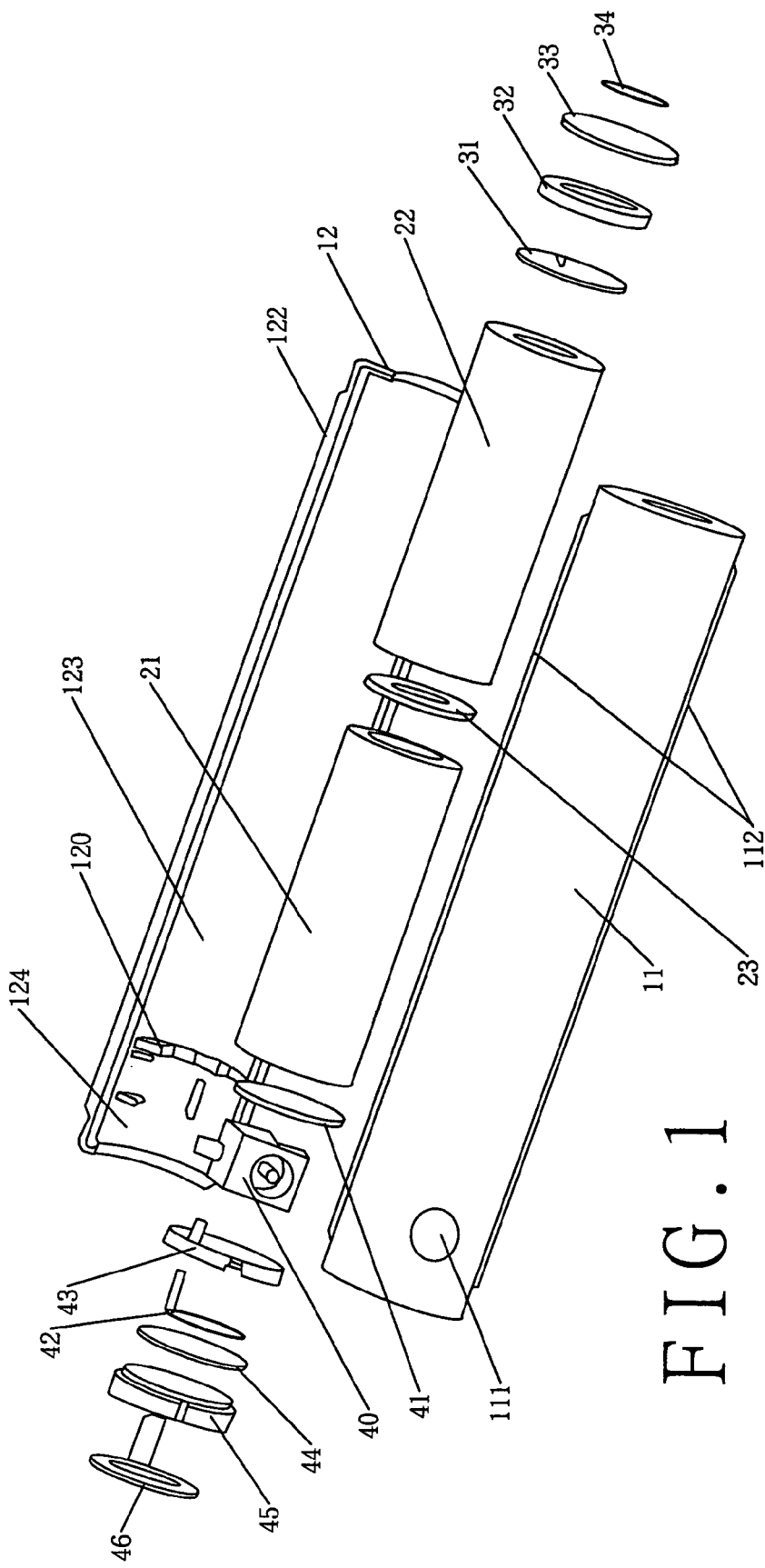
FIG. 1 is an exploded perspective view of the battery device of the present invention.

Shown in FIG. 1 is a preferred embodiment of a composite battery device of the present invention, which can be used with a flashlight, and includes a casing, and a battery set. The battery set include a first single-part battery 22, and a second single-part battery 21.

Figures 2, 3:
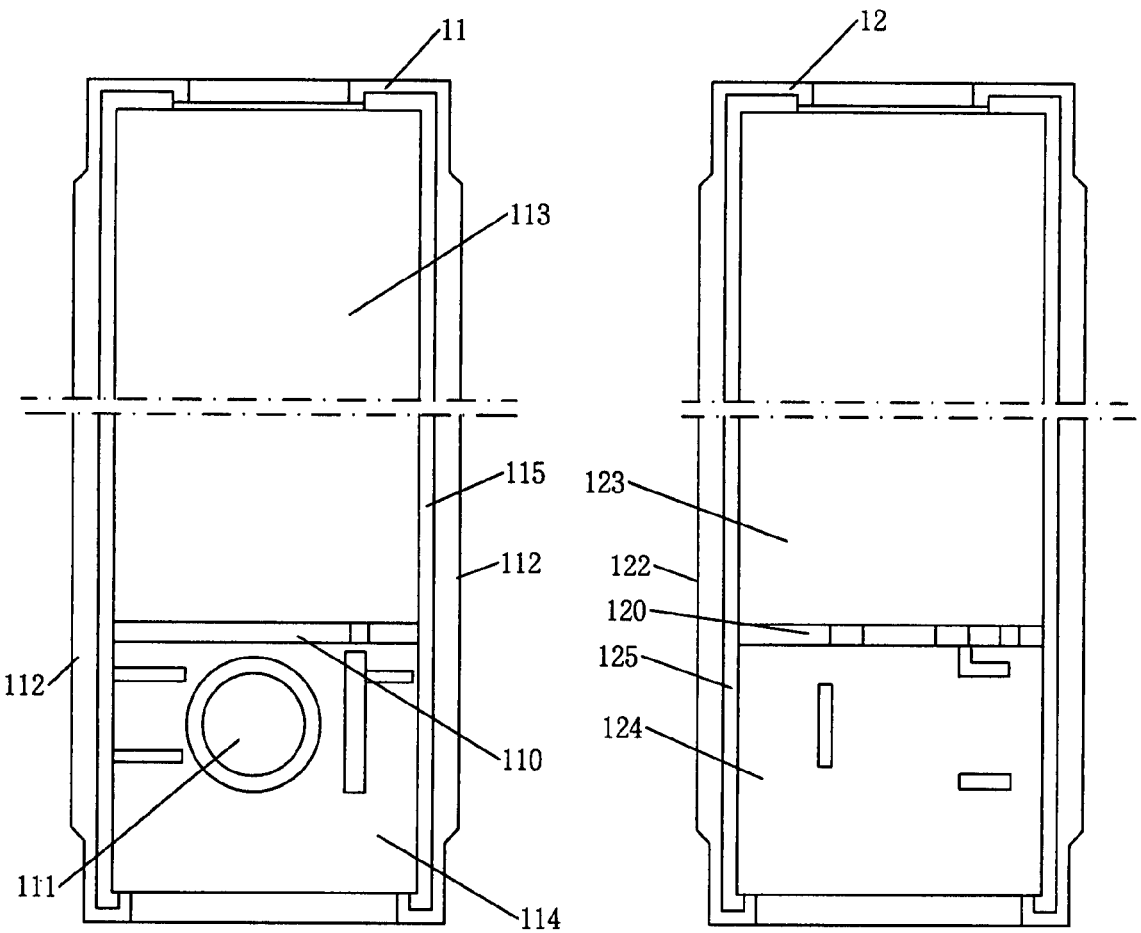
FIG. 2 is a side view of the right covering part of the casing of the composite battery device of the present invention.
FIG. 3 is a side view of the left covering part of the casing of the composite battery device of the present invention.

The casing comprises a right covering part 11, and a left covering part 12. Referring to FIG. 2, the right covering part 11 has a separating rib portion 110 in an internal space thereof, which divides the right covering part 11 into an upper holding portion 113 for containing the single-part batteries 22 and 21, and a lower holding portion 114 for containing a socket. The right covering part 11 has a fixing wing portion 112, and a depression portion 115 on two sides thereof.

Referring to FIG. 3, the left covering part 12 has a separating rib portion 120 in an internal space thereof, which divides the left covering part 12 into an upper holding portion 123 for containing the single-part batteries 21 and 22, and a lower holding portion 124. The left covering part 12 has a fixing wing portion 122, and a protrusion 125 on two sides thereof. The right and the left covering parts 11 and 12 are joined together with the fixing wing portion 112 and 122 being in touch with each other and secured together, and with the protrusion 125 of the left covering part 12 being inserted in the depression portion 115 of the right covering part 11; the fixing wing portions 112 and 122 can be glued together or welded together by means of an ultrasonic welding machine. Therefore, the casing has a first holding room, which is defined by the upper holding portions 113 and 123 of the right and the left covering parts 11 and 12, and a second holding room, which is defined by the lower holding portions 114 and 124 of the right and the left covering parts 11 and 12.

Referring to FIG. 1, a negative electrode of the first battery 22 is connected with a positive electrode of the second battery 21 so that the first and the second batteries 22 and 21 are connected in series. And, the battery set are held in the first holding room of the casing, which is defined by the upper holding portions 113 and 123 of the right and the left covering parts 11 and 12.

Figures 4, 5:
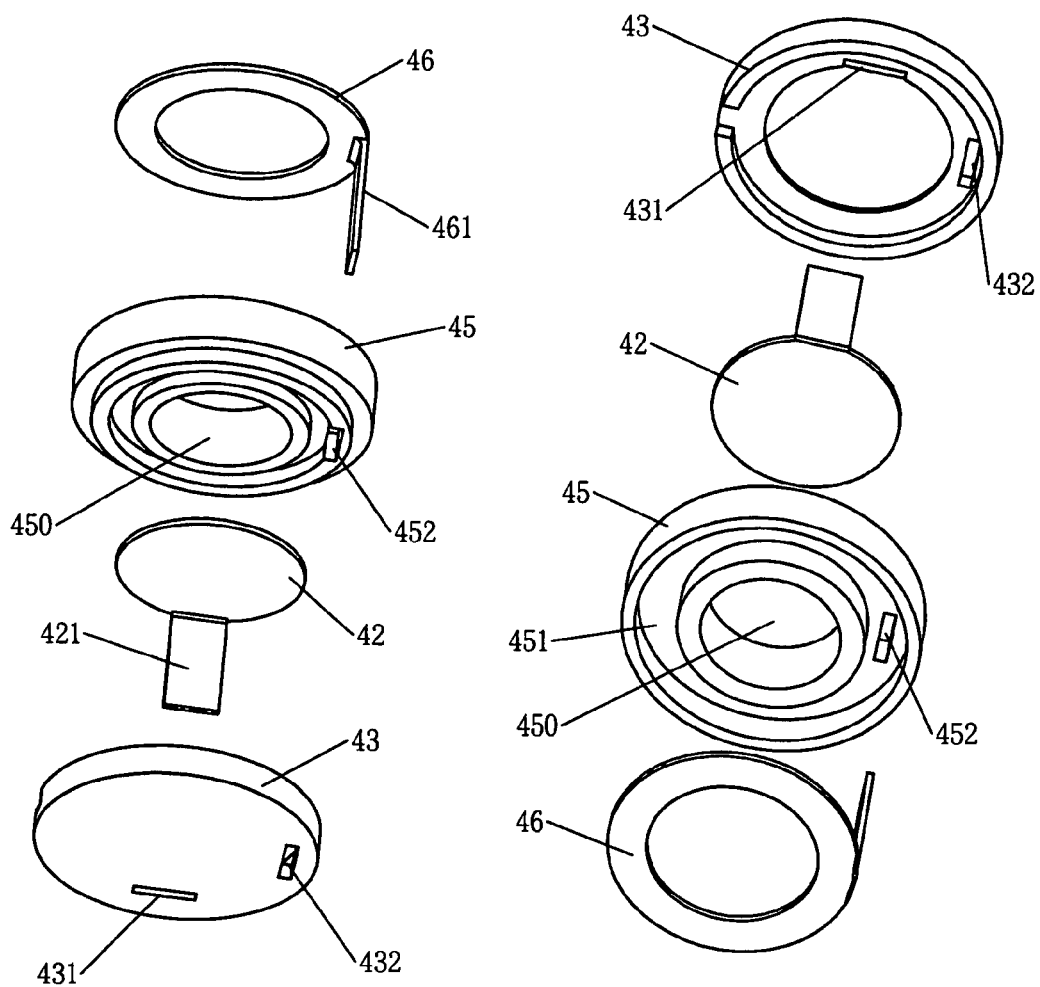
FIG. 4 is an exploded perspective view of the electrode combination of the present invention.
FIG. 5 is another exploded perspective view of the electrode combination of the present invention.
Figure 6:
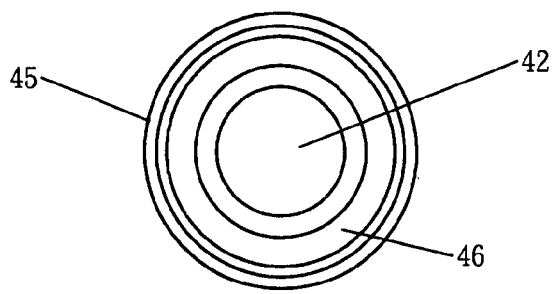
FIG. 6 is an axial view of the electrode combination in FIG. 5.

The composite battery device of the present invention further includes:

a socket 40 held in the second holding room of the casing, which is defined by the lower holding portions 114 and 124 of the right and the left covering parts 11 and 12; furthermore, the right covering part 11 has a lateral hole 111, which faces an opening of the socket 40;

a ringed pad 41, a pad 31, and a ringed sponge pad 32 held in the first holding room of the casing;

a protective circuit board 33 held in the first holding room of the casing; the protective circuit board 33 is electrically connected with positive and negative poles of the battery set as well as the socket 40 for making charging/discharging safe; the socket 40, the battery set, and the protective circuit board 33 are connected together with cords, which are passed through a gap between the separating ribs 110 and 120 of the right and the left covering parts 11 and 12, and which are preferably formed with a flat plate-shape to save space;

a positive electrode plate 34 held in the first holding room of the casing and exposed through a hole formed on a right (first) end of the casing, as shown in FIG. 1;

a ringed pad 23 interposed between the first and the second batteries 22 and 21;

an electrode holder 43 held in the second holding room of the casing; the electrode holder 43 has a square through hole 431;

a positive electrode 42 secured in the electrode holder 43; more detailedly, the positive electrode 42 is shaped like a disk, and has a wiring plate 421 thereon; the wiring plate 421 is passed through the square through hole 431 of the electrode holder 43, and connected with a positive pole of the socket 40;

a negative electrode holder 45 positioned inside the second holding room of the casing; referring to FIG. 5, the negative electrode holder 45 has an annular groove 451, and a square through hole 452 thereon, and has a middle through hole 450, through which the positive electrode 42 is exposed;

a negative electrode 46, which is secured in the negative electrode holder 45 inside the second holding room of the casing, and exposed through a hole formed on a left (second) end of the casing, as shown in FIG. 1; the negative electrode 46 is ring-shaped, and has a wiring plate 461 thereon; the ring-shaped negative electrode 46 is held in the annular groove 451 of the negative electrode holder 45 with the wiring plate 461 being passed through the square through hole 452; further, the wiring plate 461 is connected with a negative pole of the socket 40; and an adhesive member 44, the adhesive member 44 is sandwiched between the electrode holder 43 and the negative electrode holder 45 so as to couple the electrode holder 43 and the negative electrode holder 45 together.

Furthermore, the casing can be wrapped in a shrink packaging film. Such a composite battery device is usually used with those flashlights that have a tail cap, and a controlling device disposed in the tail cap.

A flashlight to be used with the above composite battery device has a groove on an inner side of a shell thereof, and the fixing wing portions 112 and 122 of the battery device are received in the groove to fix the battery device in position.

In use, after the battery device of the present invention is placed in a flashlight, and a tail of the flashlight covered with a cap, power can be supplied to the flashlight. The lateral hole 111 of the casing of the battery device will be exposed, and the battery set can be charged through a charger after the cap of the flashlight is removed; to charge the battery set, a plug of the charger is inserted in the socket 40 through the lateral hole of the casing, and the charger is plugged in; thus, an electric current will travel through the socket 40, the protective circuit board 33, the cords and wires, and the batteries 21 and 22.

The present invention is a composite battery device for serving a special purpose; if the composite battery device is used with those kinds of flashlights that don't need power supply inside of their tail caps, there in no need for the positive electrode 42, the electrode holder 43 or the adhesive member 44.

What is claimed is:

1. A battery device with plural joined-together batteries, comprising
    a battery set including at least two single-part batteries separated by a ringed pad interposed therebetween;
    a right covering part and a left covering part, which are joined together, to serve as a unitary casing; the battery set being held in the casing with positive and negative poles of the battery set being exposed through front and tail ends of the casing respectively;
    positive and negative electrodes arranged on one of front and tail ends of said casing, said positive electrode being disk-shaped and said negative electrode being ring-shaped, said positive and said negative electrodes being coaxial with said battery set, said positive electrode being installed in a positive electrode holder and said negative electrode being installed in a negative electrode holder, said negative electrode holder having a middle through hole surrounded by an annular groove disposed between a periphery of said negative electrode holder and said middle through hole, said positive electrode holder and negative electrode holder being superimposed upon each other, said positive electrode being exposed through said middle through hole of said negative electrode holder and said negative electrode being received within said annular groove of said negative electrode holder, each of said positive and negative electrodes having a wiring plate formed on an outermost periphery thereof and respectively projecting perpendicularly from said positive and negative electrodes, each of said positive and negative electrode holders including a square through hole for respectively receiving each of said wiring plates, wherein each of said wiring plates respectively contact a positive and negative pole of a socket; and
    an adhesive member disposed between said positive and negative electrode holders coupling each of said positive and negative electrode holders together.

2. The battery device as claimed in claim 1, wherein the left and the right covering parts are welded together.

3. The battery device as claimed in claim 1, wherein the left and the right covering parts are glued together.

4. The battery device as claimed in claim 1, wherein the left and the right covering parts each have rib portions on two sides of an opening thereof.

5. The battery device as claimed in claim 1 further comprising a protective circuit board, which is secured in the casing, and electrically connected with the positive and the negative poles of the battery set as well as the socket.

6. The battery device as claimed in claim 1, wherein each of the left and the right covering parts has a separating rib portion in an internal space thereof, and the separating rib portions divide the casing into a first holding portion, in which said at least two batteries are contained, and a second holding portion, in which the socket is secured; one of the left and the right covering part having a lateral hole thereon; an opening of the socket facing the lateral hole.

7. The battery device as claimed in claim 1, wherein the left covering part has protrusions on two sides of an opening thereof, and the right covering part has depression portions on two sides of an opening thereof to receive corresponding said protrusions of the left covering part, wherein said protrusions and depressions run along the entire length of said left and right covering parts respectively.

* * * * *